United States Patent
Glaubman et al.

(10) Patent No.: US 10,445,303 B2
(45) Date of Patent: Oct. 15, 2019

(54) PREDICTING AND MANAGING IMPACTS FROM CATASTROPHIC EVENTS

(71) Applicant: Risk Management Solutions, Inc., Newark, CA (US)

(72) Inventors: David Glaubman, Newark, CA (US); Inderaj Bains, San Francisco, CA (US); Philippe Stephan, Los Altos Hills, CA (US); Anders Ericson, Sunnyvale, CA (US); Cody Stumpo, San Mateo, CA (US); Bronislava Sigal, Mountain View, CA (US); Ambica Rajagopal, Pune (IN)

(73) Assignee: Risk Management Solutions, Inc., Newark, CA (US)

(*) Notice: Subject to any disclaimer, the term of this patent is extended or adjusted under 35 U.S.C. 154(b) by 732 days.

(21) Appl. No.: 13/914,774

(22) Filed: Jun. 11, 2013

(65) Prior Publication Data
US 2013/0332474 A1    Dec. 12, 2013

Related U.S. Application Data

(60) Provisional application No. 61/658,595, filed on Jun. 12, 2012.

(51) Int. Cl.
*G06F 16/22* (2019.01)
*G06F 16/81* (2019.01)
*G06Q 10/06* (2012.01)

(52) U.S. Cl.
CPC .............. *G06F 16/22* (2019.01); *G06F 16/81* (2019.01); *G06Q 10/0635* (2013.01)

(58) Field of Classification Search
USPC ........................................................ 705/7.28
See application file for complete search history.

(56) References Cited

U.S. PATENT DOCUMENTS

| | | | | |
|---|---|---|---|---|
| 7,130,779 | B2* | 10/2006 | Beverina | G06Q 20/203 703/6 |
| 7,698,246 | B2* | 4/2010 | Friedlander | G06N 7/08 706/47 |
| 7,707,050 | B2* | 4/2010 | Chen | G06Q 20/10 705/2 |
| 8,010,398 | B2* | 8/2011 | Abrahams | G06Q 10/0635 705/7.28 |
| 8,139,474 | B2* | 3/2012 | Nosley | H04L 5/0053 370/210 |
| 8,185,463 | B1* | 5/2012 | Ball | G06Q 40/00 705/36 R |
| 8,401,896 | B2* | 3/2013 | Wargin | G06Q 10/06 705/4 |

(Continued)

OTHER PUBLICATIONS

PCT International Search Report and Written Opinion, PCT Application No. PCT/US13/45080, dated Dec. 30, 2013, 12 pages.

*Primary Examiner* — Jeff Zimmerman
(74) *Attorney, Agent, or Firm* — Hickman Palermo Becker Bingham LLP

(57) ABSTRACT

A system automatically processes rules for allocation of resources to mitigate damages resulting from a catastrophic event. Overlapping interests of various stakeholders are processed in a deterministic manner to ensure repeatable processing and modeling. In one embodiment the resources are disaster aid items; in another they are obligations regarding insurance.

18 Claims, 7 Drawing Sheets

(56) References Cited

U.S. PATENT DOCUMENTS

| | | | | |
|---|---|---|---|---|
| 2007/0100669 A1* | 5/2007 | Wargin | .................. | G06Q 10/06 |
| | | | | 705/4 |
| 2008/0091634 A1* | 4/2008 | Seeman | .................. | G06N 5/022 |
| | | | | 706/59 |
| 2008/0177687 A1* | 7/2008 | Friedlander | .............. | G06N 7/08 |
| | | | | 706/46 |
| 2008/0300924 A1* | 12/2008 | Savage | .................. | G06Q 10/06 |
| | | | | 705/4 |
| 2012/0131073 A1* | 5/2012 | Olney | ................. | G06F 17/2785 |
| | | | | 707/822 |

\* cited by examiner

100

Policy PC_59
  Deductibles are absorbable
  Subject is Losses to S5 by EQ, HU, FL
  Covers
    L0_WS Share 50% Losses to S5 by HU Limit 100000 Attachment 100000
    L1_FL Share 15% Losses to S5 by FL Limit 100000 Attachment 50000
  Sublimits
    9000 (Net of Deductible) Building to S5.2 by HU
    7000 (Net of Deductible) Losses to S5.1 by HU
  Deductibles
    10000 Losses to S5 by HU
    500  BI to S5.1 by HU
    3000 Building to S5.2 by HU
    2000 BI to S5 by HU
    3700 Building to S5.7 by FL

144

160

PREDICTING AND MANAGING IMPACTS FROM CATASTROPHIC EVENTS

CROSS REFERENCE TO RELATED APPLICATIONS

This application claims the benefit of U.S. Provisional Application No. 61/658,595, filed Jun. 12, 2012 which is incorporated by reference in its entirety.

BACKGROUND

1. Technical Field

The subject matter described herein generally relates to the field of predicting and managing catastrophic event impacts, and more specifically to predicting a likely level of damage from a future catastrophic event and making decisions regarding mitigation accordingly.

2. Background Information

Numerous resources need to be deployed when disasters strike. Fire, police, National Guard and FEMA (Federal Emergency Management Agency) resources all need to be allocated in a sensible manner. For some disasters, coordination among two or more national governments may be required. Likewise, businesses need to allocate their resources in a similar fashion. For instance, if a retail establishment has a regional warehouse, it will want to know which stores are likely to be damaged (so goods are not shipped there) as well as which are near to the impacted area but are not likely to be damaged (so that goods can be shipped there to be available in the damaged area after the disaster).

Perhaps the most direct example of such allocation of resources in the face of a catastrophic event comes from the insurance industry. In that industry, multiple layers of insurers have often-overlapping coverage, all with limits (e.g., caps) and other constraints that can change the overall protection based on even slight changes in the geographic impact of a storm, or on other factors, such as actual wind speed, season, soil saturation level, or previous events that year from which a full recovery has not yet been made. This sensitivity is easily seen when one considers a disaster that spans multiple jurisdictions, such as a tropical storm with a path that could most severely impact either Mexico or the United States, depending on only a slight change in the storm's track. For instance, some insurers may have a very large stake in facilities on the U.S. side of the border but few on the Mexican side.

Similar, though less dramatic, effects are found with respect to other geopolitical boundaries such as state and county lines, municipal limits, and even natural boundaries such as flood plains, watersheds and the like.

In the past, governments, aid organizations and businesses have created documents outlining certain "rules of engagement" with respect to addressing the impact of such catastrophic events. For example, a state National Guard unit may have one plan for mobilization within the state's boundaries, but a more complex and limited manner of engagement for mobilization when a neighboring state seeks its assistance.

As these rules of engagement play out in the context of an actual event, however, the complexity of the rules becomes quite difficult to manage. For instance, there is widespread public commentary regarding the number of different law enforcement agencies with jurisdiction in Washington, D.C. The FEMA website page http://www.fema.gov/about/offices/ncr/index.shtm explains that there is an entire Office of National Capital Region Coordination to oversee and manage the overlapping responsibilities of various authorities in the region who should be included in catastrophic planning. While useful for the coordinated operation of the different Washington, D.C. law enforcement agencies, adding a layer of administration generally does not improve response times, efficiency, or timeliness.

In the private sector, various responsibilities for addressing damage due to catastrophic events are typically spelled out in contracts. Though there has been some attempt in the past to simplify the structure of these documents to best ensure that the interactions among them can be followed in a fairly certain manner, to date there remain wide variations in the manner that the various rights and responsibilities of stakeholders are defined.

It would be advantageous if there were a system and method that consistently and in a wholly deterministic manner set forth the various rights and responsibilities of stakeholders to help streamline allocation of resources to an area impacted by a catastrophic event.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Figure 1A:
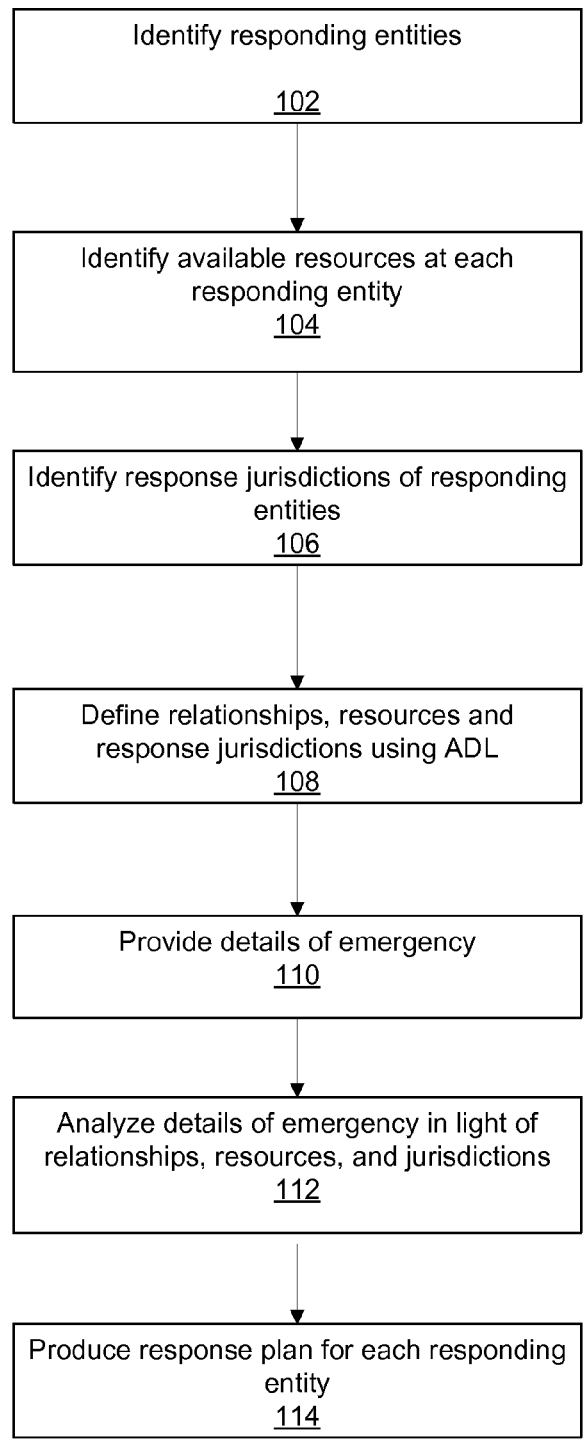
FIG. 1A illustrates a method for creating an emergency resource deployment plan using allocation definition language ("ADL"), in an embodiment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Overview

As described herein, a system and a method apply machine processing to predict where and how impacts caused by a catastrophic event are to be addressed. Language parsing algorithms are used in a repeatable fashion, so that stakeholders can model response requirements as needed for any potential catastrophic event. Such modeling can be used when allocations are first being negotiated, whenever review of exposure is desired by a stakeholder, when a disaster is imminent, and even during or after a catastrophic event (for instance with respect to event-response scenarios).

Embodiments of the present disclosure can be used to identify the allocation of response resources in the event of a disaster or emergency, document the various roles and responsibilities of different emergency responder organizations, manage a supply chain, and model the execution of emergency response resource allocations and resource deployment plans for a model disaster. Furthermore, once the roles and responsibilities are documented, embodiments described herein are used by an emergency response organization to identify its proper role in responding to an emergency, thereby improving coordination and resource allocation with other response organizations. Benefits of the embodiments described below over traditional methods of defining response roles and response resource allocations include rapidly, definitively and unambiguously identifying and modeling the allocations and roles in advance, rather than describing them in conventional written agreements which are not able to be modeled conveniently or accurately and remain open to subjective interpretation.

As detailed below, these benefits are achieved by using a processor operating in accordance with allocation definition language ("ADL") that sets forth, in a manner allowing automated processing, various rights and obligations of stakeholders such that they are initially readily comprehensible to a non-expert in computer programming while at the same time being capable of automatic compilation and processing by a computer to permit repeatable results from identical inputs. In this manner, each stakeholder can independently process various hypothetical or real input conditions to determine who is to be responsible for what response, with each stakeholder knowing that others would get the same result from this set of input conditions.

Using ADL, a goal is to produce a description of the coverage that compiles to an executable decision tree that can be operated on or by a computer processor, so that nothing is left to human subjective interpretation (in contrast to allocations written in a spoken language, such as English). An appropriate ADL agreement or resource allocation is sufficiently flexible that it does not use any workarounds but is simply "plug-and-play" for all types of agreements that are likely to be encountered. In many environments it is preferable, if not required, that the ADL allocation operation be transparent so that all stakeholders can validate processing. Likewise, in many environments an ADL resource allocation, in order to be adopted, needs to be (a) complete so that it can handle all details of all "allocations" setting forth stakeholder relationships; (b) accurate so that results are correct arithmetically as well as logically; (c) easy to use with as many familiar aspects being employed as building blocks as possible; (d) dynamic so as to provide not merely a snapshot of obligations, but a presentation of obligations along a timeline (both real and for simulation purposes); and (e) sufficiently fast in processing such that it can be implemented as a cloud-based system if desired and that it can be used to allow fast and scalable execution (for instance for insurance and reinsurance purposes such as computation of payouts for large groups of allocations and wide-ranging events) or to provide extensive what-if planning without significant computational overhead.

Similarly, in another application of the described embodiments, several organizations are interested in helping to insure against a natural disaster. Typically, the obligations of such organizations are set forth in a document with numerous terms, for instance detailing the nature of protection being provided and the locations covered. As just one example, an organization might agree to provide an "all perils" coverage that optionally includes an "hours" clause limiting coverage as a function of time (e.g., 72 hours or less of wind exposure above a set threshold or 168 hours or more of flood exposure above a set threshold). There may be overall coverage limits described as to a first percentage of a first amount of loss and a second percentage of an additional amount of loss. Further, there may be sublimits, such that overall flood exposure will not exceed a certain amount, or that overall loss per facility location is limited to a certain amount. Still further, the agreement may set forth deductibles for each loss, maximum exposures per geographic area, and waiting periods for claims.

To add to the complexity, not just one organization (e.g., an insurance company, an emergency response entity) but several such organizations each may have overlapping responsibilities with respect to a given geographic area, emergency event, piece of property, or facility. To avoid doubled-up resource allocations, typically there is some rule for determining which of several organizations has primary responsibility (and the extent of such responsibility), which has secondary, tertiary, and even further subordinate responsibility.

In traditional situations, using English language contracts and not a compilable ADL resource allocation, these various rules and terms inject a great amount of uncertainty, such that various stakeholders may not have the same understanding of exactly what type of loss will be addressed by which organization. For instance, if damage comes from a hurricane (a "named windstorm"), do flood-specific or wind-specific limits apply? Is a flood-relief organization primarily responsible or a wind-relief organization? Traditionally, there has been significant disagreement among parties regarding such provisions. Some standardization has been attempted in the past, for example via the RISKLINK™ facility provided by Risk Management Solutions of Newark, Calif. However, such approaches have continued to need a great amount of human interpretation and expert analysis, both to enter information initially and to interpret results after a catastrophic event. At times, low quality information has led to poor decision-making by various stakeholders.

ADL Illustration

One benefit of using ADL to draft contracts, define allocation of resources (whether for supply chain management or emergency response), or prescribe areas of responsibility for a set of cooperating entities, is that information describing each of these situations (e.g., terminology of insurance contracts, contracts for the sale of goods, service contracts, roles and responsibilities for emergency response entities) is defined using a uniform nomenclature, and a logical structure (i.e., "ADL"). In the example of responding to a catastrophe, emergency response entities (e.g., private entities, state and federal agencies, municipal departments) identify their available resources, the function and/or applicability of the resources to various emergencies, the location of the resources, and the jurisdictional and/or roles to be played by each agency in advance using ADL. Using ADL then permits a computer-executable agreement and resource database to be stored. The ADL agreement and database can then be used to model a coordinated response to a disaster by providing the features of the catastrophe to the system. Furthermore, because the responsibilities and resources of the various responding entities are identified clearly by the system using a uniform nomenclature and structure, the system permits a prompt response that is coordinated with other responding entities and requiring little human intervention in the event of an actual disaster. Whether using ADL in the context of an emergency or event response or an insurance contract, ADL permits the quick and accurate interpretation of many (whether tens, hundreds, thousands, or even orders of magnitude more) competing and/or overlapping agreements and/or jurisdictional responsibilities that would not otherwise be interpretable by humans lacking the assistance of a computer applying and/or embodying the methods and systems described herein.

An example method 100 of using ADL to create an emergency resource deployment plan is shown in FIG. 1A. For the method 100 to produce an emergency resource deployment plan, information relevant to forming the plan is provided. For example, the various entities that can respond to an emergency are identified 102 as well as the resources 104 corresponding to each entity. Information describing the resources, the types of responses, and the jurisdictions are also identified 104, 106 for each responding entity. For example, the U.S. Coast Guard can provide rescue services and border control resources but only within specific jurisdictions corresponding to ports and coastlines forming the border of the United States. Similarly, a municipal fire department has ambulances, fire trucks, and specially trained personnel applicable to a wide variety of emergencies, but generally limited to within the borders of the municipality. The types of responses, the conditions under which an entity responds, and the aforementioned resources and entities are defined 108 using ADL and stored in systems described below in the context of FIG. 2.

In the event of an emergency, the details of the emergency are provided 110. For example, the type of risk events (e.g., flood, fire, business interruption, power outage, security), the geographic area of the risk event, duration, infrastructure damage, and the like are provided. This information is than analyzed 112 in light of the previously stored relationships, resources, and response jurisdictions available to respond. By analyzing 112 the resources that can be applied in the context of the emergency, a resource deployment plan is produced 114 that describes the equipment, personnel, and materiel to be supplied to an emergency.

Figure 1B:
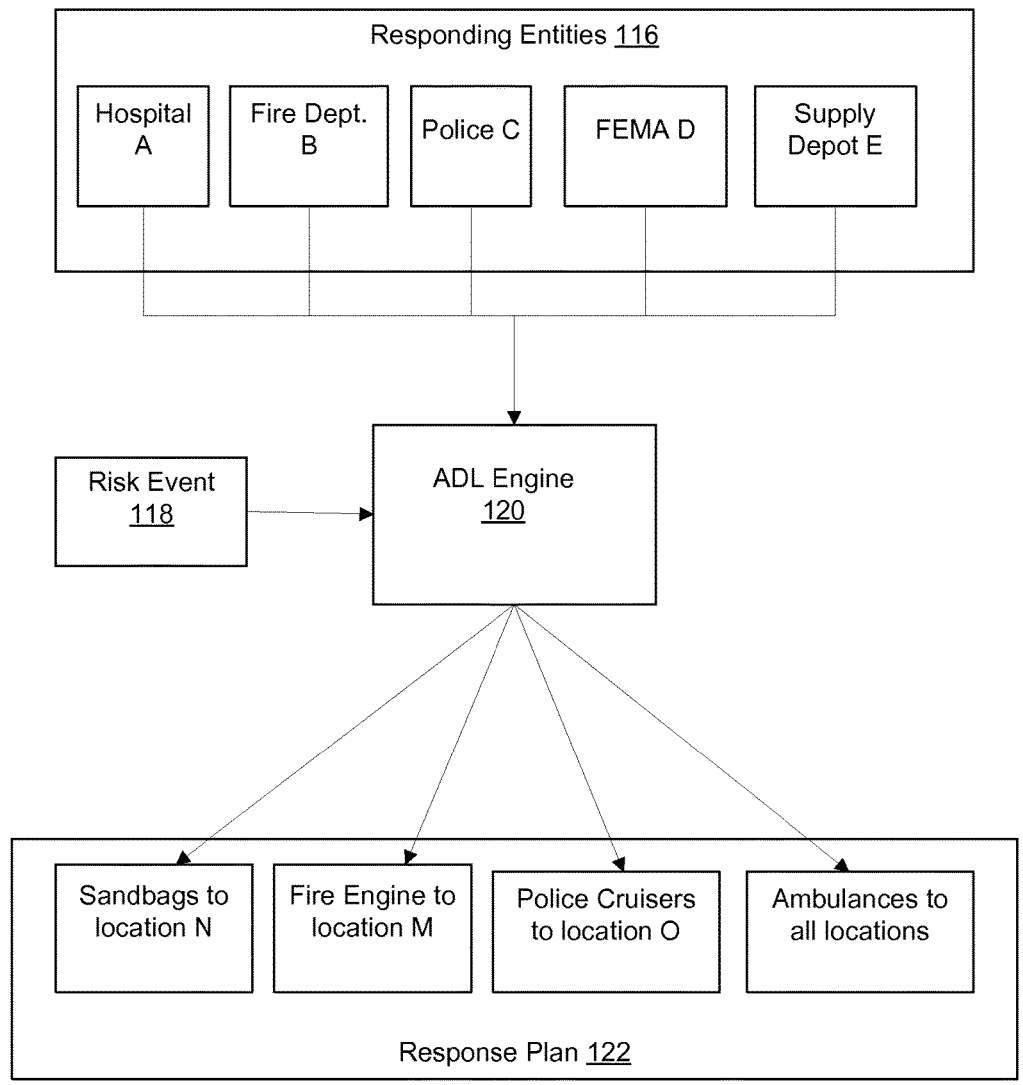
FIG. 1B schematically illustrates inputs to and outputs from an ADL engine used create an emergency resource deployment plan, in an embodiment.

FIG. 1B schematically illustrates the method 100 in which responding entities 116 are defined. The resources and jurisdictions corresponding to each responding entity are defined using ADL nomenclature and structure, as described below. This information is then either stored in or retrieved by an ADL engine. The details of an emergency (or more generically a "risk event") 118 are input into the ADL engine 120. The ADL engine 120 then processes the various ADL inputs to produce an emergency resource deployment plan 122 that assigns or allocates resources from the various responding entities 116 to the emergency.

Techniques and methods similar to those described above can be applied to insurance contracts, which are merely another type of response to an emergency. In the example of an insurance contract, because the parties, relationships, quantities, conditions, and computations are defined using the uniform nomenclature and logical structure, the ADL contract can then be readily understood by users. The ADL insurance contract is also readily interpreted by a computing device, enabling the rights and obligations of the various parties to be modeled and/or determined.

An example application of ADL to an insurance contract follows, although this example is readily adaptable to an emergency response example. In this example, the information used to specify rights and obligations common to insurance contracts using a uniform contract nomenclature and logical structure is shown. The specifying information in this example contract includes, but is not limited to, a declarations section defining the parties and variables of the contract, contract subject matter, coverage and limits ("covers"), sub-limits, and/or deductibles, as shown below.

Declarations
Insured is ABC
Insurer is XYZ
ContractName is P1
Subject is Loss to CompanySchedule, Suppliers by All Perils
Occurrence is 72 Hours by Wind, 168 hours by Flood
Currency is USD
Subject is Losses to S1 by all Perils
Occurrence=72 Hours by Wind, 168 hours by Flood
Covers
50% Share of 500M per occurrence xs (i.e., "in excess") 250M per occurrence excluding Flood
25% Share of 250M xs 0 per occurrence
Sublimits
$350M annual aggregate on loss to CompanySchedule by Flood
$100M on loss to CompanySchedule by Wind where county is Miami-Dade Florida and event is Named Storm
$10M per location on loss to Suppliers.Factories
$25M on contingent business interruption to Suppliers
Deductibles
25000 per location on loss to CompanySchedule by Wind where event is Named Storm
5% of ReplacementCost per location on loss to CompanySchedule by Wind where event is Named Storm
500K (maximum) on loss to CompanySchedule where state is Florida
50K per location on loss to CompanySchedule by Flood in FEMA Special Flood Hazard Area
50K per location on business interruption to CompanySchedule
48 hours waiting period on business interruption to CompanySchedule This example, simplified from a typical insurance contract for the purposes of clarity, illustrates the uniform nomenclature and logical structure of ADL, and is explained in more detail below.

In another example, an ADL contract can be used with insurance contracts that do not specifically relate to hazards, but instead related to financial positions for a set of conditions. These "positions" are either primary positions, which serve as a source of claims but do not take losses, or secondary positions, which can take a loss from a contract. As with the foregoing example, ADL is applied in the context of positions for various financial products, including insurance and re-insurance contracts.

The uniform nomenclature and a logical structure are similar to the foregoing example, and are adapted to the specific case of positions. For example, a "Payout" function is defined in ADL that identifies the losses taken against a contract in a secondary position. A subject in a primary position ADL has a form of <Outcome> to <RiskItems> by <Events>. <RiskItems> is typically specified by one or more schedules of locations or groups of people, <Events> is usually a list of Causes of Loss and <Outcome> is one of the keywords Loss, Damage, or Hazard that is a function of the position taken. A subject in a secondary contract (e.g., re-insurance) has a form of <position> [net of <position>], where <position> is the name of a position.

ADL Structure and Nomenclature

In the example of resource allocation, using ADL provides a consistent logical structure and a consistent nomenclature that is used to identify resources and responsibilities when responding to an emergency. As with other examples described herein, using this structure and nomenclature enables the resource allocation and the responsibilities of each responding entity to be readily complied, analyzed, modeled, and/or provided to a user upon execution by a processor.

In one example, an entire "supply chain" for responding to an emergency is identified using ADL methods and systems. That is, the resources for collecting and healing the injured and restoring basic services are identified. For example, the number of hospital beds at each hospital in an area is identified, along with the number and passenger capacity of ambulances, the number of fire trucks, the number of electrical grid and natural gas repair vehicles and technicians, and other similar resources useable to stabilize and emergency situation. Example categories used to identify the resources and the roles of the responding entities include: (1) type of disaster (which determines which resources and entities to respond to the disaster); (2) the entities capable of responding (whether private, federal, state, or municipal); (3) the location of the disaster; and (4) the responsibilities and appropriate responses of each responding entity.

Similarly, in the example of contracts, using ADL provides a consistent logical structure (common to contracts of a given type) that acts as an organizational framework, enabling a contract to be readily understood by a user or reader, and compiled and/or analyzed by a computing device. This is analogous to physically responding to a disaster: various responding insurers have different but sometimes overlapping responsibilities depending on the nature and location of the disaster and terms of various agreements.

In the insurance context, the four categories used as a framework for an insurance contract include: (1) declarations defining the name and type of the contract, the parties to the contract, variables used in the contract but not needed for execution of the contract, or other nomenclature used to facilitate searching; (2) a subject defining a source and scope (or "resolution") of the circumstances (e.g., a loss for an insurance contract) to which the contract responds; (3) terms detailing constraints such as deductibles and sub-limits, which establish certain aspects of loss that will not be covered by the contract; and (4) covers establishing a response (e.g., payout) and a particular responder's (e.g., insurance carrier's) portion thereof under the contract. Each of these four categories is shown in the above example. Different, additional, or fewer categories can be used depending on the type of contract. For example, the subject can be included in the Declarations section.

A declarations section is used in one embodiment to capture parameters relevant to the relationship defined by the contract including but not limited to applicable dates, the type of contract, the parties, financial aspects, and metadata for filtering, searching, and analysis. The declarations section also defines variables used elsewhere in the ADL contract. These variable definitions are provided for the benefit of readers of the contract, but are not used by the computer system for compiling or execution of the ADL contract. Examples of user-defined variables defined in a declarations section of an ADL contract include the name of the contract or a note made for reference by future readers of the ADL contract. A user-defined variable can have its value set in the declarations section and then used in other parts of the contract. For example, a variable WINDEDAMT can be defined as "1000" so that any occurrence of the variable in the contract has the defined value. Examples of system variables, which have a constrained syntax because the variables are used by the system in specific ways, include the subject (described below), the covered occurrence, the monetary currency used in the contract, and the contract period. Variable defined in the declarations section can be used as query terms by users or other systems. Variables used in other parts of the contract can be similarly defined (e.g. Subject or Occurrence variables), but these variables may constrained by the syntax used or by legal value ranges.

A subject of the ADL contract describes the circumstances to which the ADL contract responds by identifying (1) covered losses (e.g., a location insured against a fire or flood, a business insured against losses from a business interruption) based on risk exposures items (i.e., the potential loss to a specific party stemming from damage to a risk item, which is an item that can be damaged by an occurrence of a peril or hazard) and (2) events posing a risk to the exposure items (e.g., hurricanes with category higher than 2 inuring recoveries based on contracts and allocations). A subject is either explicitly or implicitly associated with a contract, contract term, and cover. In common applications, these subjects are quite complicated, specifying any of a variety of factors contributing to the severity of risk posed by a risk exposure and/or the breadth and diversity of risk exposure items. An example subject includes a requirement for a second risk event of a calendar year in which a hurricane traverses a given range of latitude/longitude, makes landfall in Florida, and causes damage greater than $1B to a specified industry. Further, subjects may cross-reference other contracts and the output of other contract, thereby modeling the interaction of many inter-related contracts (e.g., for reimbursing the writer of a contract or providing secondary or umbrella insurance to the insured).

As mentioned above, while these details are provided for the example of an insurance contract, analogues exist in the example of emergency resource allocation. For example, in the resource allocation example, the "declarations" define the entities responding to an emergency, the "terms" define the responsibilities (e.g., response, jurisdiction or location, time and speed of response) of the responding entities, and the subject of the ADL document defines emergency events (e.g., crimes, natural disasters, massive infrastructure failures, fires) that various parties (e.g., federal, state, and local police, other federal law enforcement, emergency responders, FEMA) may respond to and for whom the various roles and responsibilities may not be clear.

Continuing with the insurance contract example, the terms category includes two elements: (1) sub-limits and (2) deductibles. Each of these elements includes as many terms using the ADL nomenclature needed to accurately and precisely define the terms of the contract. Furthermore, each term and each element is associated with a subject further defining the conditions to which the sub-limit and/or deductible is applicable. For example, an ADL primary home insurance contract may include a deductible of $1000 dollars, wherein the deductible is defined by a subject of water damage caused by house plumbing failure.

Analogous ADL contract terms and elements are defined for different types of contracts. For example, an ADL contract for the sale of goods can include a per unit price term that includes subjects adjusting or re-defining the price at various volumes of units purchased. Alternatively, elements can be added to reflect price adjustments or penalties for late delivery, early delivery, raw material costs, and other terms.

A sub-limit is used in the ADL insurance contract example to define a cap on the amount of loss that is subject to recovery from the insurer by the insured. In one embodiment, sub-limits are defined by an amount (either a constant or a function), a type (either "ground-up" or "net of deductibles"), an aggregation description (indicating whether and how the sub-limit aggregates with respect to time), a subject defining the conditions to which the sub-limit is applicable, and a status flag (activated/de-activated).

A deductible is used in the ADL insurance contract example to define the financial burden borne by an insured party upon experiencing a loss to a covered risk exposure item (i.e., the insured property). A deductible includes, but is not limited to, amount, aggregate, subject and status components as described above, as well as a deductible function (e.g., standard, franchise, disappearing percent of loss (i.e., a deductible proportional to the loss amount)), interaction type (with respect to lower-level deductibles, e.g., minimum, maximum, single largest (i.e., only the largest deductible of several related losses is actually deducted)) and non-ranking references (lower-level deductibles for which credit cannot be taken).

A covers category is used in the ADL insurance example to define the insured property and the nature and extent of the insurance coverage. The ADL nomenclature used to define the covers category includes, but is not limited to, two elements: (1) a covered subject that defines the conditions to which the covers respond and (2) an action taken in response to the covered subject requiring a response. Actions taken in an insurance context include covered losses and payouts.

Covered losses in this embodiment include subject losses net of terms and losses based on payouts associated with "child" covers; that is, covers that address sub-subjects within covers at a higher level in the nested hierarchy described above. Payouts, continuing with the insurance example, are based on attachment points, limits of insurance, a defined payout function, or a defined percentage share. In an example, a first cover can include two covered losses that are themselves covers (and the first cover can take as a subject the maximum, minimum, sum, difference, etc. of the two included covered losses); each of these three overall covers has a defined payout. Thus, nesting of covers is typical and leads to extensive interactions even within a single contract.

Using these four categories, contracts, and more specifically the relationship and interaction between the various contract terms, are expressed in a simple manner. Even highly complicated contracts and relationships can be expressed simply by adding elements and/or terms using the ADL nomenclature, rending complicated contracts calculable by a computing device.

Similarly, using ADL enables a first party to the contract to quickly describe contractual terms using ADL. Other parties to the contract, using the uniform nomenclature and logical structure of ADL, can simulate the performance of the contract under varying conditions thereby determining whether the contract terms actually conform to their intent. For example, the other parties to the contract can simulate a performance of an insurance contract by executing a hypothetical weather event (e.g., a category 4 hurricane) through a contracted subject (e.g., a set of retailer warehouses in Florida) to determine what the resulting financial insurance obligations would be.

In one embodiment of a system using ADL to draft, describe, and simulate contracts, a user interface subsystem provides user prompts and accepts user inputs relating to the components discussed above. From that user information the system generates an ADL description of the corresponding contract. Furthermore, once a first contract is designed based on ADL, it is available for re-use as a template, such that a stakeholder's employees who are not computer programmers can readily input parameters to allow new contracts to be generated based on existing contracts. As will be evident to those skilled in the art, this provides various benefits, such as consistent handling of contracts, increasing modeling efficiency, creating "branded" forms of contracts, and the ability to send very small amounts of data from one computer system to another to characterize a contract (e.g., one can send only relevant parameters from a system of record to fully define the corresponding rights and obligations). As such, an organization may have millions of contracts, but only a handful of materially different aspects of those contracts.

The systems and methods described here further provide mechanisms for analyzing data quality, for undertaking exposure analytics, for facilitating open modeling and dynamic portfolio modeling, and for sharing data relating to such varied uses over cloud systems through simple granting of permissions to access data (as the interactions among the data are defined through the ADL). These features facilitate, in particular, convenient and transparent emergency response planning and resource allocation between different responding entities, each of which may use different terminology, computer systems, or tools to communicate and plan operations. As a specific example, such applications greatly simplify "what-if" analysis and sensitivity analysis to determine the impact of, for instance, adding coverage for an additional geographic area in which a storm might have impact.

As noted above, the discussion here has centered on one specific application in the insurance industry, but the concepts described above are equally applicable to other applications including, but not limited to, deployment of emergency equipment to an area impacted by a natural disaster, the sale of goods, production planning, supply chain management (including the production, transportation, and storage of goods), and others. The various categories and definitions are merely adapted to match the resources to be allocated and the responsibilities of the responding entities.

In order to more fully explain the systems and methods described above, what follows is a more detailed description of an ADL according to one embodiment.

Example ADL Contract and ADL Contracting System

Figure 1C:
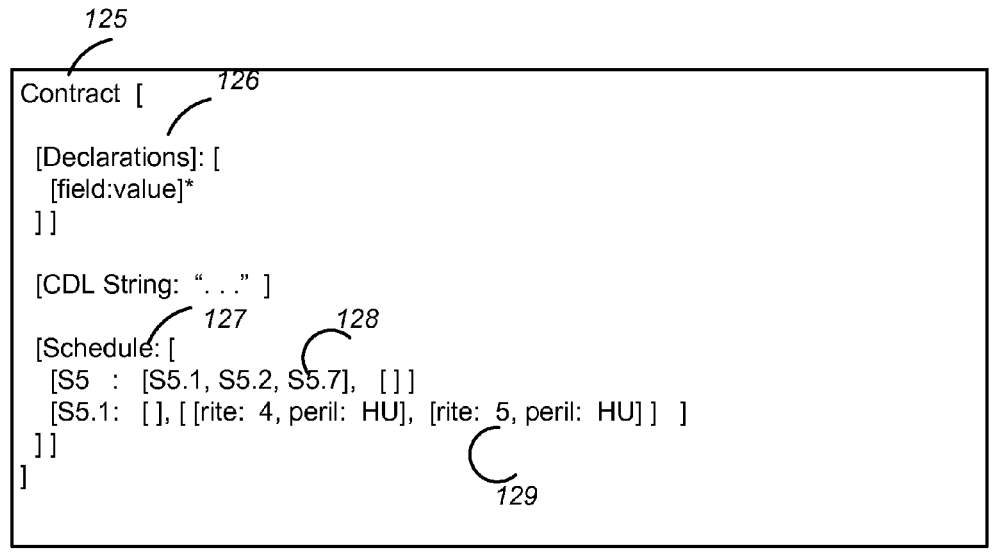
FIG. 1C illustrates a hierarchical logical structure used for constructing an insurance contract using ADL, in an embodiment.
Figure 1D:
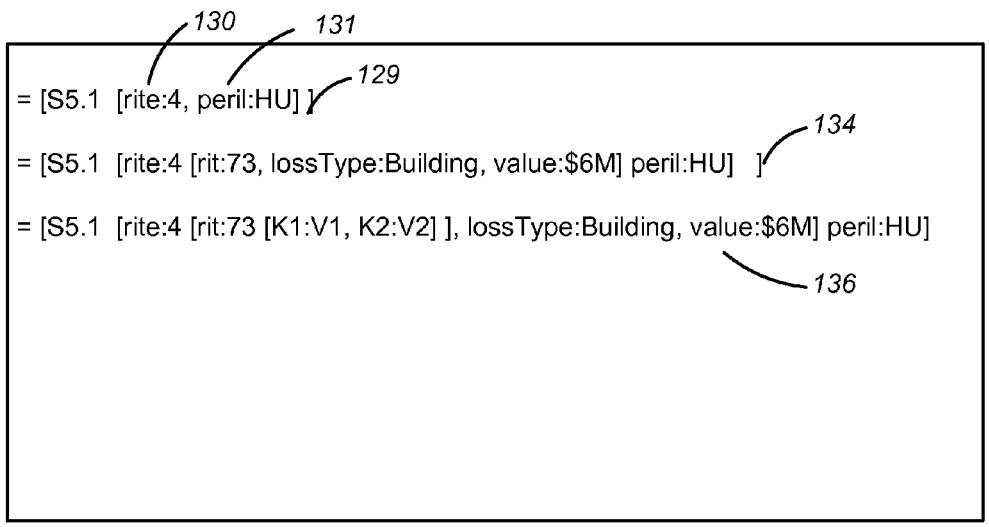
FIG. 1D illustrates a set of nested entries defining terms and covers for an example subject in an allocation using ADL, in an embodiment.

FIGS. 1C and 1D illustrate, respectively, a hierarchical logical structure 124 used for constructing an insurance contract using ADL, and a set of nested entries 140 defining terms and covers for an example subject. While an insurance example is used in this case, the terminology is easily adapted to apply to emergency response asset allocation.

FIG. 1C illustrates an example of a logical structure 124 used to draft an ADL insurance contract. In this example, the structure 124 includes a contract title field 125, a declarations field 126, and a schedule 127 that contains a nested hierarchy of terms and covers of the contract, although other examples may have different configurations (e.g., terms can be stored separately from the schedule and linked using a reference or other mechanism). One benefit of a logical structure similar to the structure 124 is that ADL contracts are easily analyzed for data quality, undertaking exposure analytics, facilitating open modeling and dynamic portfolio modeling, and for sharing data relating to such varied uses over cloud systems through simple granting of permissions to access data (as the interactions among the data are defined through the ADL).

In the structure 124 of FIG. 1C, the title field 125 is used to name the contract or resource allocation using either a user-defined or system generated unique identifier. In some examples, the title field 125 can include an identifier that references related contracts or can include meta-data that facilitates searching.

The declarations field 126 defines the name and type of the contract, the parties to the contract, variables used in the contract that are used by other elements of the ADL contract, but not needed for execution of the contract, or other terms used to facilitate searching.

The schedule 127 describes the terms and covers of the ADL contract. As described above, one benefit of a contract drafted using ADL is that simple contracts, as well as very complicated contracts, can be defined by adding terms and covers using the ADL nomenclature. The schedule 127 illustrates the nested hierarchy that can be used to define a contract with increasing precision. For example, the schedule 127 includes a subject index 128 listing the various subjects covered by the insurance contract of this example and described in more specificity elsewhere in the ADL contract. Subject 5.1 129, a component of schedule S5 as identified by the dot notation (e.g., "S5.1, S5.2, S5.3) is one example of a more specific description and is described in the context of FIG. 1D. The dot notation used to identify a hierarchical relationship between levels within a schedule can also be used to identify a nested hierarchy within other categories. For example, a risk event identified as "HU.SU" can define the risk event of a storm surge ("SU") resulting from a hurricane ("HU"). As mentioned above, a schedule can be adapted to a resource allocation example by, for example, identifying a responding entity and the resources available for use by the responding entity (e.g., S1: Municipal Fire Station, S1.1: Ambulance, S1.2 Fire truck, S1.3 Emergency Communication System).

In some examples, schedules, risk items, risk events, and other factors can be used multiple times and for different categories. In these examples, as described below, each hierarchy is parsed into a separate "tree" structure, and calculated accordingly.

FIG. 1D illustrates a subject of a schedule 129 that is used to describe the details of terms and covers for an insured (identified as "5") in increasing detail using a nested hierarchy of terms and covers. The schedule 129 defines a first level of detail for the insured S for risk item represented in the risk item event field 130 as "4" (defined elsewhere in the ADL system) for a risk factor identified in the "peril" field 131 as "HU" (i.e., a hurricane). A second level of detail can be accessed by successively expanding any of these fields, as shown in line 134 (showing an insured loss type of a building up to a value of $6 million), and line 136, which shows key value pairs. Key value pairs to associate a name (the 'key') with a fixed value. For example, the Declarations section can be considered as a set of key value pairs using the notation "key is value". In the declarations field 126, this is shown as "[field:value]*". In line 136, [K1:V1, K2:V2] is used to represent attributes of "RIT 73" for purposes of filtering on the values. For example. "RIT 73" may have the following attributes: NumStories: 50 Construction: Steel. This would support a filter of "where value>$5M and Construction is Steel".

Figures 1E, 1F:
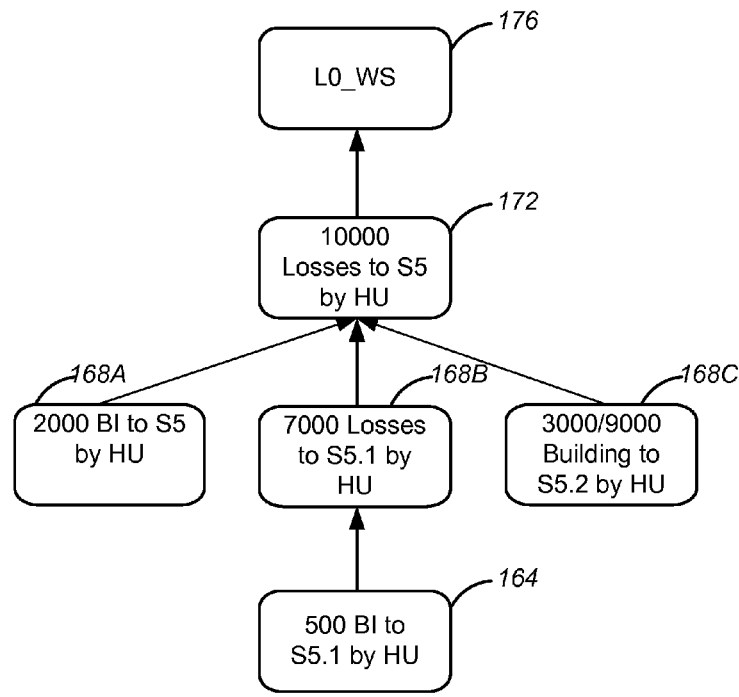
FIG. 1E illustrates an allocation using ADL that includes additional terms and complexity over the illustrations in FIGS. 1C and 1D, in an embodiment.
FIG. 1F schematically depicts compiling an allocation using ADL, in an embodiment.

FIG. 1E illustrates an ADL contract 144 that includes additional terms and complexity compared to the depictions in FIGS. 1C and 1D. The ADL contract 144 includes, as described above, a title, a subject, covers, sub-limits, and deductibles. Within each of the four categories are appropriate descriptions, as shown. For example, the deductibles section includes deductibles for various risk items (business interruption, building) by various risk item events (hurricane, flood).

FIG. 1F schematically illustrates a compiling process 160 for creating a function that uses claims (e.g., damage or hazard to an exposure by an event) to produce an incurred loss to be paid by the contract or to produce a set of actions (e.g., allocate resources to be deployed) to an event or emergency. This compiling process 160 illustrates one feature of an ADL contract; that is, by using a nested hierarchy of terms, covers, and subjects, even complicated contracts or arrangements of jurisdiction or responsibility can be readily understood in part or in whole. Another feature of the compiling process 160 is that it infers hierarchies of the term and cover graphs using syntactic aspects (e.g., A.B is a child of A) and externally supplied domain information (e.g., Miami-Dade is in Florida is in USA) stored in other elements of the system, as described below.

In the process 160 shown, hurricane risk events to risk event items listed on schedule S5 are compiled to estimate the associated risk event exposure. The compiling process 160 begins from a lower level of a nested hierarchy, in this case at schedule 5.1 164 identifying business interruption ("BI") coverage caused by a hurricane. The business interruption coverage 164 is compiled with other hurricane related losses 168A-C in schedule 5.1 (shown in FIG. 1E). These covers 168A-C are then compiled with all S5 hurricane related losses 172 and then totaled 176. In this way, the various terms, covers, deductibles, and sub-limits are conveniently displayed and analyzed.

The structure illustrated by FIG. 1F is used in some examples to describe the resource allocations and roles of different emergency responders. For example, a risk event (i.e., a disaster or emergency requiring a response) is identified at schedule 5.1 164. The geographically and jurisdictionally relevant emergency responders, and their respective resources 168A-C are provided. The risk event 164, and the damaged caused thereby, is then analyzed against the resources and responsibilities of the emergency responders and complied 172.

Figure 2:
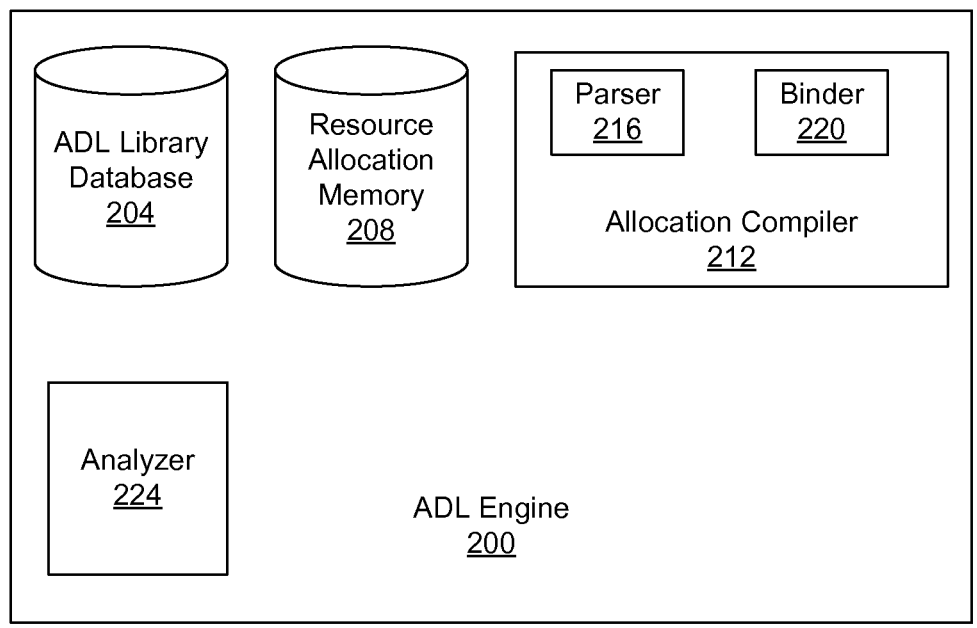
FIG. 2 illustrates an ADL engine for generating, processing, modeling, and analyzing resource allocations using ADL, in an embodiment.

FIG. 2 illustrates an example of an ADL engine 200 for drafting new ADL contracts, compiling existing ADL contracts, and/or searching and analyzing ADL contracts to determine risk exposure, coverage, and/or identifying overlapping coverage between different insurers. In other examples, the system may also be used to identify and/or clarify the roles and jurisdictional responsibilities of emergency responders and/or various levels of governmental entities. The ADL engine 200 includes an ADL library database 204, an ADL resource allocation memory 208, a compiler 212, a parser 216, and binder 220, and an analyzer 224.

The ADL library database 204 stores ancillary information used to compile the contract. In particular, the ADL library database stores information used for reference including, but not limited to, risk events, perils, and hazards (e.g., hurricane and its relationship to sub-perils storm surge and wind, named storms) and risk event items (e.g., physical addresses, locations, values, structure types, or other reference data), emergency responders, and supply chain elements. In other embodiments, the ADL library stores nomenclature used to define emergency response entities, resources within each entity for responding to an emergency, jurisdictional and geographic response boundaries, contingency resources (e.g., resources in neighboring jurisdictions), and the like. The ADL library database can be stored in any volatile or non-volatile memory, such as optical or magnetic storage, and stored in, for example a relational database. Other methods of storing and organizing the information in a database are equally applicable.

Other information stored in the ADL library database 204 includes relationships between exposures, and relationships between, and information about, risk items and risk events (e.g., a named list of related items, wherein each item on the list includes a description of the features of the item).

In the emergency response example, a user defines schedules listing the various entities (e.g., a city fire department, a county sheriff department, a state police barrack, a federal agency, a private contractor, a business) responsible for responding to a particular event (e.g., a hurricane or a terrorist attack). Within each schedule, the responsibilities of responding entities can be identified using ADL. Overlapping responsibilities, or gaps in responsibilities, can then be analyzed using other features of the ADL engine 200.

The resource allocation memory 208 of the ADL engine 200 stores templates for generic contracts and specific, completed contracts. That is, in the event that an entity produces multiples of a certain type(s) of contract that usually includes common elements, a template having these common elements can be created to facilitate the generation of the contracts and stored in the resource allocation memory 208. Specific, completed contracts are stored in the resource allocation memory 208 for execution.

The resource allocation memory 208 stores the pre-compiled contract. For example, elements of pre-compiled contract shown in FIGS. 1E and 1F are stored in the resource allocation memory. These pre-compiled contracts are then used by the system, as explained below, to analyze the interactions between a plurality of related contracts. The resource allocation memory 208 is, as with the ADL library database 204, embodied in any volatile or non-volatile memory, such as optical or magnetic storage. Similarly, a relational database can be used to store information. Other methods of storing and organizing the information in a database are equally applicable.

The compiler 212 of the ADL engine 200 transforms the schedules stored in the ADL library database 204 using a processor in communication with memory and other computer components, and the templates and references stored in the ADL resource allocation memory 208, into an ADL contract. The compiler 212, using a parser 216 and a binder 220, retrieves information stored in these locations and compiles it according to a method 300 described below.

The analyzer 224 is used to receive inputs describing a risk event and a risk event item to model the results of an ADL contract, thereby providing further understanding to the contracting parties regarding their rights and responsibilities under the contract. Upon receiving user inputs, the analyzer 224 applies the user inputs to risk events and/or risk event items in an ADL contract stored in the ADL resource allocation memory 208 defined using other elements of the ADL engine 200 described above. A result is produced that estimates the risk exposure to the risk item according to the terms of the ADL contract. This facilitates effective negotiation between contracting parties, financial planning and risk management.

In an emergency response example, the analyzer 224 receives inputs describing an emergency and is then used to model the jurisdictions and/or responses of emergency responders. For example, an ADL contract can be used to define risk events, risk event items, and the jurisdictions and scope of responsibilities for emergency responders using a uniform nomenclature in much the same way that an insurance contract is defined. The analyzer 224 is then used receive user inputs of a theoretical emergency response, and produce a result modeling the jurisdictions of the emergency responders. This is then used to identify duplicative coverage or gaps in emergency response before the actual emergency occurs.

In a supply chain management example, an ADL contract can be used to define factories, shipping locations, consumers, shipping durations between factories and suppliers, shipping durations between factories and consumers, vulnerable points in the supply chain, and other similar network features. The analyzer 224 is then used to model or predict impacts to the system so that responses and/or contingencies can be developed. In one implementation, discontinuation of a particular raw material can be modeled, and the resulting impacts on the entire supply chain modeled. Similarly, in another implementation, a transportation hub can be modeling as non-functional, and the resulting impacts on the entire supply chain modeled.

Compiling an ADL Contract

Figure 3:
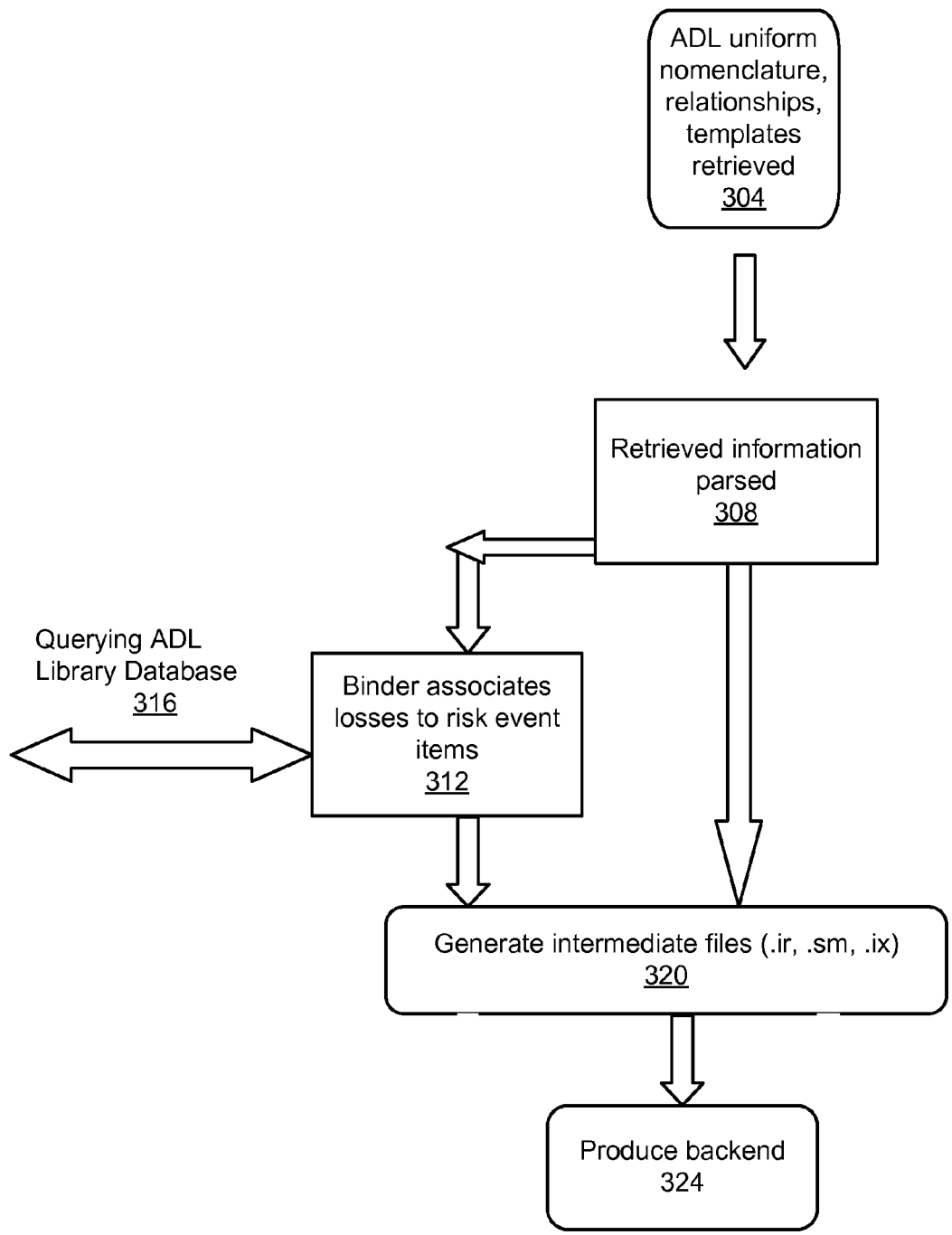
FIG. 3 illustrates a method for compiling ADL allocations, in an embodiment.

FIG. 3 illustrates a method 300 for compiling an ADL contract as executed, in one example, by the compiler 212. In this example, the information used to define and draft an ADL contract is retrieved 304 from the ADL library database 204, the ADL resource allocation memory 208, or other sources. This information includes ADL files that are relevant to a particular contract but not necessarily the contract itself (e.g., actuarial tables, risk item values, data related to historical risk events or hazards).

The retrieved information is parsed 308 by the parser 216, and processed 312 by the binder 220 thereby building intermediate files 320. The parser 216 creates a hierarchical structure of the various schedules and dependencies between risk events, risk event items, and covers, as illustrated in FIG. 1F. The various dependencies can be graphically represented as a tree-structure, as shown in FIG. 1F, although this graphical depiction is not required for analyzing the The parser 216 also checks that the ADL nomenclature and logical structure is error-free regarding both syntax and semantics. The ADL syntax is defined by an LALR(1) grammar and parsed using compiler tools such as "lex/yacc," "bison," or other similar compiler tools. Syntax errors can be identified upon compiling. The parser 216 also includes a look-ahead LR ("LALR") parser that analyzes the ADL grammar as well as the Outputs of compiling include an intermediate representation (e.g., a high level instruction stream representing cover and term graphs) and a symbol table, which maps subject strings to nodes in a term graph of the intermediate representation. Nodes of the term graph contain an ordered list of terms (for example "MIND 2000" is an intermediate representation instruction to apply a Minimum Deductible of 2000 to the current node). Edges of the term graph are the parent nodes(s). Nodes of the cover graph contain the intermediate representation instructions defining a particular cover (e.g., "OCCLIM 1000000" is an intermediate representation instruction to apply an occurrence limit of 1M). The edges of the cover graph define the relationship between and among covers and the root nodes of the term graph.

The Binder 220 process binds the symbol table to particular risk items and events (for example, a client account or a portfolio insurance contracts). The binder 220 applies subjects identified in the ADL contract and the schedules generated by the parser 216 to associate 312 losses against risk item exposures at the appropriate location in the hierarchical structure of the ADL contract. The binder 220 associates (or "binds") 312 losses to the appropriate risk item exposures in the ADL contract by identifying a subject of the risk item, querying 316 a source of data (e.g., the ADL Library Database 204), and associating a loss with the corresponding risk item event. In some examples, the binder 220 is analogous to the link phase of a standard language compiler (e.g., C++, Fortran). Intermediate files (e.g., an .ir, .sm, or .ix file) are generated 320, as described above.

A backend is produced 324 using these intermediate files for display to a user or analysis by the user. The results of compilation (e.g., an intermediate representation and a symbol table) and binding (a mapping from claims (e.g., Building A was 70% damaged by Event 1) to node number in the term graph) are compiled into, for example, C++ and associated data files, although output can be produced for any analogous system or language. A dynamic link library ("DLL") can be used for distributing the compiled contract to any of a plurality of a plurality of devices, systems, users, or ADL contracts.

Computing Machine Architecture

Figure 4:
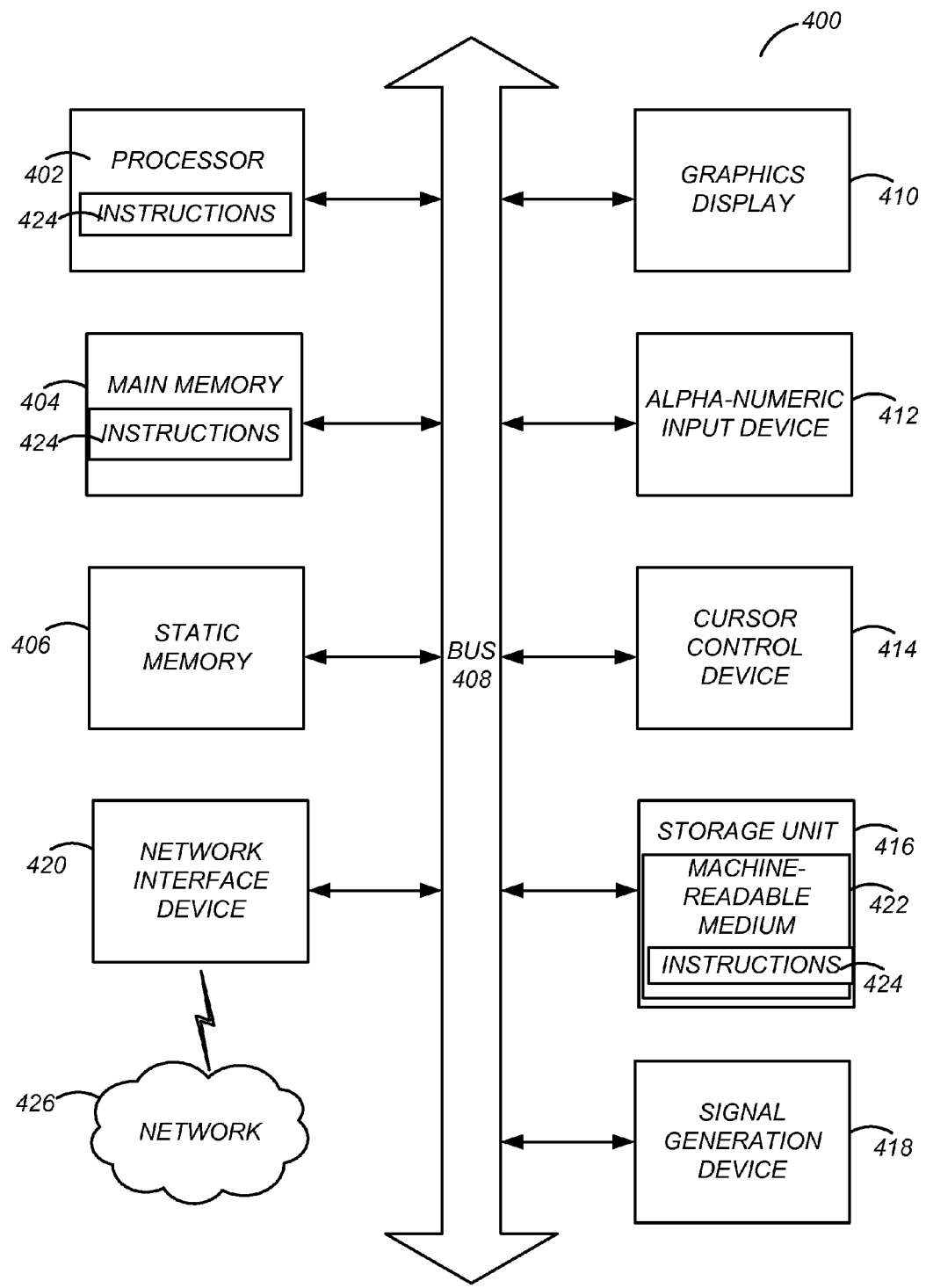
FIG. 4 illustrates components of an example machine able to read instructions from a machine-readable medium and execute those instructions in a processor.

FIG. 4 is a block diagram illustrating components of an example machine able to read instructions from a machine-readable medium and execute those instructions in a processor to perform the machine processing tasks discussed herein, such as the engine operations discussed above. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a data store 416, a signal generation device 418 (e.g., a speaker), an audio input device 426 (e.g., a microphone) and a network interface device 420, which also are configured to communicate via the bus 408.

The data store 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network (not shown) via network interface 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 4. Alternatively, hardware or software modules may be stored elsewhere within a computing system.

As referenced herein, a computer or computing system includes hardware elements used for the operations described here regardless of specific reference in FIG. 4 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience. This description should be read to include one or at least one and the singular also includes the plural unless it is obvious that it is meant otherwise.

Upon reading this disclosure, those of skill in the art will appreciate still additional alternative structural and functional designs for a system and a process for providing machine processing of resource allocations in response to a catastrophic event through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A system for producing an allocation model, comprising:
    a resource allocation memory configured to store a plurality of resource allocations, each resource allocation of the plurality of resource allocations defining a particular contract using an allocation definition language (ADL) and including a set of references to related nomenclature and schedules;
    an ADL library database for storing ancillary information used to compile the plurality of resource allocations, the ancillary information including related nomenclature and schedules referenced by the plurality of resource allocations;
    an allocation compiler, including a processor, in communication with the resource allocation memory and the library database, the allocation compiler comprising a parser and a binder, the allocation compiler configured to:
        receive the ancillary information and the plurality of resource allocations;
        compile the plurality of resource allocations to generate the plurality of compiled resource allocations, each compiled resource allocation of the plurality of resource allocations comprising a respective set of one or more computer-executable; instructions, wherein compiling the plurality of resource allocations includes:
        using the parser, generating and storing a hierarchical structure defining relationships between the related nomenclature and schedules referenced by the plurality of resource allocations;
        using the binder, retrieving and associating corresponding ancillary information with elements of the hierarchical structure;
    an analyzer in communication with the resource allocation memory, the analyzer configured to:
        receive user inputs defining a risk event and a risk event item;
        in response to receiving the user inputs, produce a risk exposure to the risk event item from the risk event by modeling the risk event and the risk event item using one or more compiled resource allocations of the plurality of compiled resource allocations, wherein modeling the risk event and the risk event item using the one or more compiled resource allocations comprises, for each compiled resource allocation of the one or more compiled resource allocations, executing the respective set of one or more computer-executable instructions.

2. The system of claim 1, wherein the related nomenclature and schedules include emergency response entities and emergency response resources.

3. The system of claim 1, wherein the analyzer receives emergency response resources and emergency response entities for responding to an emergency and generates a resource deployment plan allocating the resources in response to the emergency.

4. The system of claim 1, wherein the related nomenclature comprises another contract, another data structure or other information stored in the ADL library database.

5. The system of claim 1, wherein the hierarchical structure comprises a graph of nodes and edges for each resource allocation, the graph describing terms of the particular contract and relationships between the terms.

6. The system of claim 1, wherein the related nomenclature and schedules include declarations, subjects, covers, and terms.

7. The system of claim 6, wherein the terms comprise a sub-limit or a deductible.

8. The system of claim 6, wherein the covers comprise a covered subject or an action.

9. A computer program product comprising a non-transitory computer-readable storage medium containing computer program code that, when executed by a processor, performs an allocation modeling method, the method comprising:

storing a plurality of resource allocations, each resource allocation of the plurality of resource allocations defining a particular contract using an allocation definition language (ADL) and including a set of references to related nomenclature and schedules;

storing ancillary information used to compile the plurality of resource allocations in an ADL library database, the ancillary information including related nomenclature and schedules referenced by the plurality of resource allocations;

compiling the plurality of resource allocations, using the ancillary information, to generate the plurality of compiled resource allocations, each compiled resource allocation of the plurality of resource allocations comprising a respective set of one or more computer-executable instructions, wherein compiling the plurality of resource allocations includes:

using a parser, generating and storing a hierarchical structure defining relationships between the related nomenclature and schedules referenced by the plurality of resource allocations;

using a binder, retrieving and associating corresponding ancillary information with elements of the hierarchical structure;

receiving user inputs defining a risk event and a risk event item;

in response to receiving the user inputs, producing a risk exposure to the risk event item from the risk event by modeling the risk event and the risk event item using one or more compiled resource allocations of the plurality of compiled resource allocations, wherein modeling the risk event and the risk event item using the one or more compiled resource allocations comprises, for each compiled resource allocation of the one or more compiled resource allocations, executing the respective set of one or more computer-executable instructions.

10. The non-transitory computer-readable storage medium of claim 9, wherein the related nomenclature and schedules include response entities and emergency response resources.

11. The non-transitory computer-readable storage medium of claim 9, the compiling further comprising:
   receiving emergency response resources and emergency response entities for responding to an emergency; and
   generating a resource deployment plan allocating the resources in response to the emergency.

12. The non-transitory computer-readable storage medium of claim 9, wherein the related nomenclature comprises another contract, another data structure or other information stored in the ADL library database.

13. The non-transitory computer-readable storage medium of claim 9, wherein the hierarchical structure comprises a graph of nodes and edges for each resource allocation, the graph describing terms of the particular contract and relationships between the terms.

14. The non-transitory computer-readable storage medium of claim 9, wherein the related nomenclature and schedules include declarations, subjects, covers, and terms.

15. The non-transitory computer-readable storage medium of claim 14, wherein the terms comprise a sub-limit or a deductible.

16. The non-transitory computer-readable storage medium of claim 14, wherein the covers comprise a covered subject or an action.

17. A computer-implemented method for allocation modelling, comprising:

storing a plurality of resource allocations, each resource allocation of the plurality of resource allocations defining a particular contract using an allocation definition language (ADL) and including a set of references to related nomenclature and schedules;

storing ancillary information used to compile the plurality of resource allocations in an ADL library database, the ancillary information including related nomenclature and schedules referenced by the plurality of resource allocations;

compiling the plurality of resource allocations, using the ancillary information, to generate the plurality of compiled resource allocations, each compiled resource allocation of the plurality of resource allocations comprising a respective set of one or more computer-executable instructions, wherein compiling the plurality of resource allocations includes:

using a parser, generating and storing a hierarchical structure defining relationships between the related nomenclature and schedules referenced by the plurality of resource allocations;

using a binder, retrieving and associating corresponding ancillary information with elements of the hierarchical structure;

receiving user inputs defining a risk event and a risk event item;

in response to receiving the user inputs, producing a risk exposure to the risk event item from the risk event by modeling the risk event and the risk event item using one or more compiled resource allocations of the plurality of compiled resource allocations, wherein modeling the risk event and the risk event item using the one or more compiled resource allocations comprises, for each compiled resource allocation of the one or more compiled resource allocations, executing the respective set of one or more computer-executable instructions.

18. The computer-implemented method of claim 17, wherein the hierarchical structure comprises a graph of nodes and edges for each resource allocation, the graph describing terms of the particular contract and relationships between the terms.

* * * * *